(12) United States Patent
Singhal et al.

(10) Patent No.: US 12,079,287 B2
(45) Date of Patent: *Sep. 3, 2024

(54) SELECTIVE PRESENTATION OF RICH EXPERIENCES IN SEARCH

(71) Applicant: Microsoft Technology Licensing, LLC, Redmond, WA (US)

(72) Inventors: Aman Singhal, Bellevue, WA (US); Marcelo Medeiros De Barros, Redmond, WA (US); Prithvishankar Srinivasan, Seattle, WA (US); Max Artemov, Seattle, WA (US); Donald Frank Brinkman, Jr., Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/672,625

(22) Filed: Feb. 15, 2022

(65) Prior Publication Data
US 2022/0171819 A1  Jun. 2, 2022

Related U.S. Application Data

(63) Continuation of application No. 16/353,308, filed on Mar. 14, 2019, now Pat. No. 11,281,733.

(51) Int. Cl.
*G06F 16/95* (2019.01)
*G06F 16/908* (2019.01)
(Continued)

(52) U.S. Cl.
CPC ........ *G06F 16/9535* (2019.01); *G06F 16/908* (2019.01); *G06F 16/9538* (2019.01); *G06F 16/9574* (2019.01); *G06F 17/15* (2013.01)

(58) Field of Classification Search
CPC ............. G06F 16/9535; G06F 16/9574; G06F 16/9538
See application file for complete search history.

(56) References Cited

U.S. PATENT DOCUMENTS

| 2006/0041553 A1 | 2/2006 | Paczkowski et al. |
| 2006/0161542 A1 | 7/2006 | Cucerzan et al. |

(Continued)

FOREIGN PATENT DOCUMENTS

| CN | 102982120 A | 3/2013 |

OTHER PUBLICATIONS

"International Search Report and Written Opinion for PCT Patent Application No. PCT/US20/016001", Mailed Date: Apr. 20, 2022, 14 pages.

(Continued)

*Primary Examiner* — Loc Tran
(74) *Attorney, Agent, or Firm* — CALFEE, HALTER & GRISWOLD LLP

(57) ABSTRACT

A method of selectively providing different types of search engine results to different searchers is provided. A browsing history for each of a plurality of unique identities is logged. A unique identity is associated with a rich segment experience responsive to the browsing history for the unique identity satisfying correlation criteria of the rich segment experience. The rich segment experience is configured to present curated segment-specific information with other search results on a search result web page. Responsive to receiving a search query from the unique identity previously associated with the rich segment experience, the rich segment experience is presented with other search results on the search result web page. Responsive to receiving the search query from a different unique identity not previously associated with the rich segment experience, other search results (Continued)

are presented without the rich segment experience on the search result web page.

20 Claims, 7 Drawing Sheets

(51) Int. Cl.
    *G06F 16/9535*     (2019.01)
    *G06F 16/9538*     (2019.01)
    *G06F 16/957*     (2019.01)
    *G06F 17/15*     (2006.01)

(56) References Cited

U.S. PATENT DOCUMENTS

| | | | |
|---|---|---|---|
| 2007/0294615 A1* | 12/2007 | Sathe | G06F 16/337 |
| | | | 707/E17.112 |
| 2011/0040753 A1 | 2/2011 | Knight | |
| 2015/0169693 A1 | 6/2015 | Stekkelpak | |
| 2017/0060960 A1* | 3/2017 | Kim | G06F 16/335 |
| 2018/0365433 A1* | 12/2018 | Hayasaka | H04L 9/0861 |

OTHER PUBLICATIONS

"Office Action for U.S. Appl. No. 16/353,308", Mailed Date: Nov. 12, 2020, 10 pages.
"Response to the Office Action for U.S. Appl. No. 16/353,308", filed Feb. 10, 2021, 15 pages.
"Final Office Action for U.S. Appl. No. 16/353,308", Mailed Date: May 4, 2021, 15 pages.
"Response to the Final Office Action for U.S. Appl. No. 16/353,308", filed Oct. 4, 2021, 13 pages.
"Notice of Allowance and Fees Due for U.S. Appl. No. 16/353,308", Mailed Date: Nov. 16, 2021, 18 pages.
"InnovationQ Plus—IP.com Search", Retrieved Date: Nov. 5, 2021, Retrieved At: <<https://iq.ip.com/discover>>, 1 page.
"Office Action Issued in European Patent Application No. 20709389.9", Mailed Date: Oct. 9, 2023, 8 Pages.
First Office Action Received for Chinese Application No. 202080020946.8, mailed on Mar. 1, 2024, 12 pages (English Translation Provided).
First Examination Report Received for India Application No. 202147039018, mailed on Apr. 12, 2024, 08 pages.
Summon to attend Oral Proceedings 115(1) Received for European Application No. 20709389.9, mailed on Apr. 10, 2024, 12 pages.
Second Office Action Received for Chinese Application No. 202080020946.8, mailed on Apr. 23, 2024, 10 pages. (English Translation Provided).

\* cited by examiner

SELECTIVE PRESENTATION OF RICH EXPERIENCES IN SEARCH

RELATED APPLICATION

This application is a continuation of U.S. patent application Ser. No. 16/353,308, filed on Mar. 14, 2019, and entitled "SELECTIVE PRESENTATION OF RICH EXPERIENCES IN SEARCH". The entirety of this application is incorporated herein by reference.

BACKGROUND

Internet search engines and other search providers may be designed to provide many different search results in response to search queries. Internet search engines may be configured to populate a search result web page with different types of search results. For example, a conventional search result web page may include a list of uniform resource locators (URLs) for relevant web sites. Such URLs do not themselves provide information relative to the search, but merely link to web pages likely to have relevant information. Some search engines may also be configured to present, along with the other URLs, a rich segment experience that is itself a summary of useful information relevant to the search and not just a link to other information sources. A rich segment experience may include information related to a search query that is curated and presented in a visually distinct manner relative to other conventional URL search results. Rich segment experiences may make it easier for a user to quickly digest relevant information related to a search query without having to explore other URLs.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method of selectively providing different types of search engine results to different searchers is provided. A browsing history for each of a plurality of unique identities is logged. A unique identity is associated with a rich segment experience responsive to the browsing history for the unique identity satisfying correlation criteria of the rich segment experience. The rich segment experience is configured to present curated segment-specific information with other search results on a search result web page. Responsive to receiving a search query from the unique identity previously associated with the rich segment experience, the rich segment experience is presented with other search results on the search result web page. Responsive to receiving the search query from a different unique identity not previously associated with the rich segment experience, other search results are presented without the rich segment experience on the search result web page.

DETAILED DESCRIPTION

In some cases, different searchers may perform the same search query with different intentions or different interpretations of the search query. Prior to the herein disclosed search strategies, the different searchers may be provided with search results that include the same rich segment experience that the search engine correlates with the search query. For example, different searchers may provide the search query "Rams" to a search engine. A first searcher may be researching the Los Angeles Rams football team. A second searcher may be researching Dodge Ram trucks. A third searcher may be researching male sheep. Depending on the particular rich segment experience that the search engine correlates to the search query, at least some of the different searchers will not find the search results to be useful if all searchers are provided the same rich segment experience.

Accordingly, the present disclosure is directed to a methodology for determining a searcher's interests towards a particular experience/segment and using these interests as a factor to decide whether or not to display a particular rich segment experience responsive to a search query. By selectively providing rich segment experiences based on a searcher's interests, the intentions of the searcher may be anticipated and a more useful search result that is tailored for the particular searcher may be provided.

Figure 1:
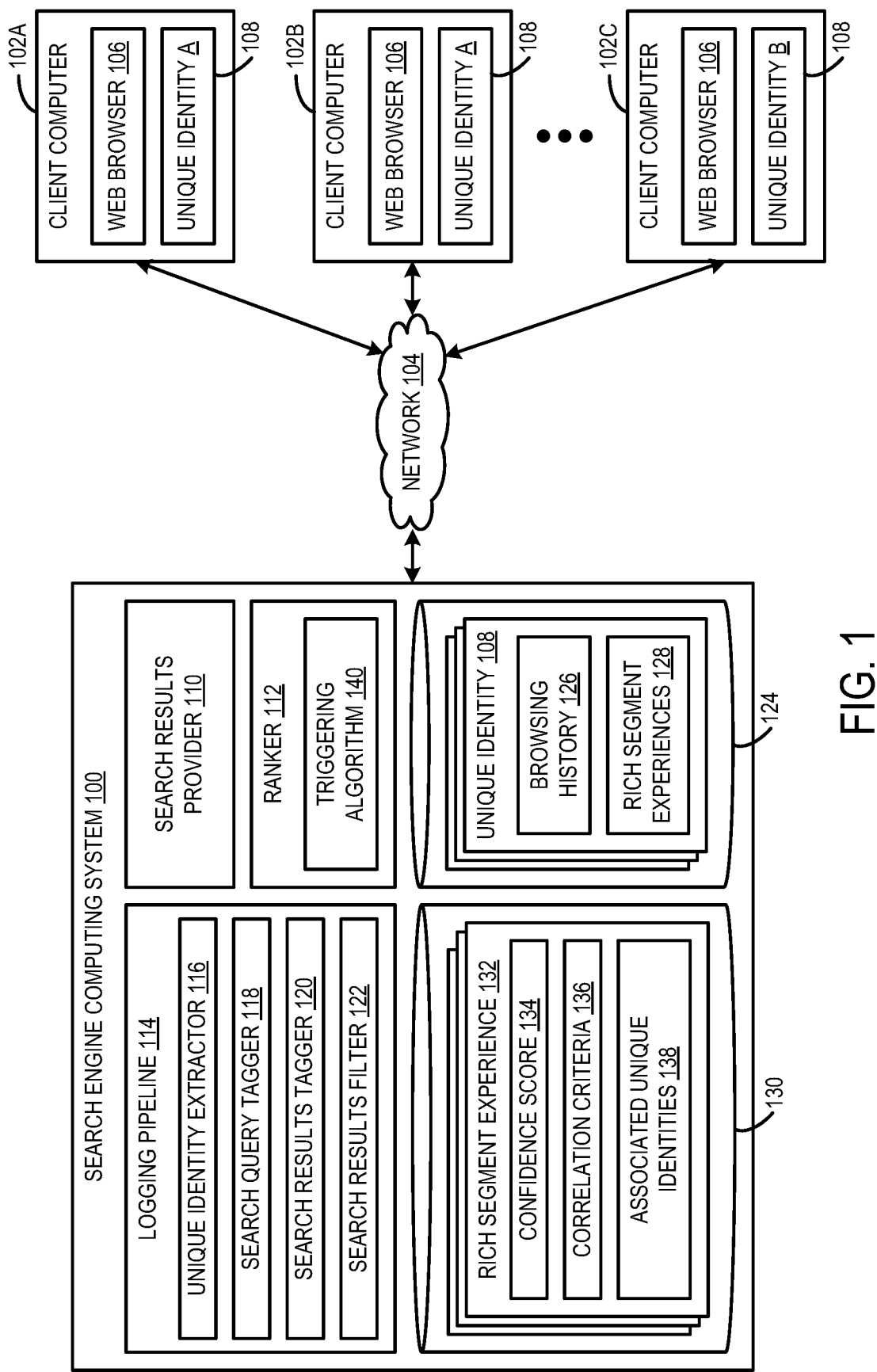
FIG. 1 schematically shows an example search engine computing system.

FIG. 1 shows an example computing architecture that enables different types of search engine results to be provided to different searchers. A search engine computing system 100 may be configured to provide search functionality to a plurality of client computers 102 (e.g., 102A, 102B, 102C). For example, the search engine computing system 100 may enable a client computer 102 to perform searches using any suitable queries (e.g., natural language keywords, regular expression patterns, Boolean operators for composing multiple queries, etc.), on any suitable search domain (e.g., web site(s), encyclopedia(s), database(s), social networking platforms, financial/medical/scientific records, etc.). The search engine computing system 100 may be communicatively coupled to each of the plurality of client computers 102 via a computer network 104, such as the Internet. The search engine computing system 100 may be configured to provide search functionality to any suitable number of different client computers 102.

The plurality of client computers 102 may be any suitable type of computing device, e.g., a mobile phone, personal computer, intelligent assistant speaker device, etc. One or more of the plurality of client computers 102 optionally may include a display subsystem configured to present a web browser 106. The web browser 106 may be configured to present one or more pages, e.g., a search page configured to allow a user to input search queries and/or view search results, examples of which are shown in FIGS. 4A-4F described in further detail below. Alternately or additionally, one or more of the plurality of client computers 102 may allow a user to input search queries and/or receive search results in any other suitable fashion, e.g., one or more of the plurality of client computers 102 may include a microphone and speaker and may be configured to receive queries via a natural language speech utterances received at the microphone, and to output search results via speech audio output at the speaker. Although the present disclosure may be described in terms of a graphical web browser 106, the methods and processes disclosed herein may be implemented in the context of any other search interface, e.g., a speech-based natural language search interface.

Different client computers 102 may be associated with different unique identities 108. The unique identities 108 may take any suitable form. In some examples, a unique identity 108 may be a user identity that is persistent across different computing devices. For example, a user may perform search queries on a desktop computer, a tablet, and a smart phone that are all associated with the same unique identity, and all of those search queries may be attributed to that same unique identity. In some such examples, the unique identities may take the form of anonymous identifiers (ANIDs) anonymously linked to user accounts. In other examples, a unique identity 108 may be associated with a particular client computer. For example, search behavior and/or browsing history of different users that share the same client computer 102 may be tracked via the same unique identity 108 that is associated with the client computer 102. In some such examples, the unique identities may take the form of client computing device identifiers (Client IDs).

In the depicted example, client computer 102A and client computer 102B are associated with unique identity A, such that the search behavior and browsing history tracked on each of the client computers 102A and 102B is attributed to unique identity A. For example, both client computers 102A and 102B may be associated with the same user. Further, client computer 102C is associated with unique identity B, such that the search behavior and browsing history tracked on client computer 102C is attributed to unique identity B, which differs from unique identity A.

The search engine computing system 100 is configured, responsive to receiving a search query from a client computer 102, to return one or more search results on a search result web page for presentation in the web browser 106. The search engine computing system 100 may be configured to serve "raw" queries in the form of literal text input by the user. Alternately or additionally, the search engine computing system 100 may be configured to serve "normalized" queries in the form of a computer-readable description of query content, e.g., by processing a computer-readable description indicating an intent of a query representing a question, goal, and/or task of the user indicated by the query, by processing one or more entities in the query, and/or by processing syntactic structure of a query (e.g., a parse tree for the query). Query normalization may be performed by any suitable computer device(s), e.g., by a client computer 102 and/or the search engine computing system 100. Normalized queries may include relevant informational content of a query (e.g., relevant intents/entities) while limiting the amount of variability among queries (e.g., different raw queries that are rephrasings of the same question may be normalized into the same normalized query).

The search results may include different types of search results that are retrieved from different sources. The search engine computing system 100 may be configured to return results from any suitable domain, such as different web sites on the internet or other domains. The search engine computing system 100 may return search results based on data received from one or more other computers. For example, the search engine computing system 100 may cooperate with a search results provider 110 to send a search query to the search results provider 110 and receive search results for a search query, which may include relevant web sites, documents, etc., as desired for the search domain. The search results provider 110 may be configured to determine relevant search results for a query in any suitable fashion, e.g., by searching in a database, indexing/scraping web sites or documents, etc.

Non-limiting examples of search result entries that may be presented on the search result web page may include non-curated search results, such as a listing of URLs of relevant web sites. Such URLs do not themselves provide information relative to the search, but merely link to web pages likely to have relevant information. Alternately or in addition to the non-curated search results, the search result web page may selectively include rich segment experiences 132. Each rich segment experience 132 may present a summary of useful information relevant to the search query and not just a link to other information sources. Unlike the list of URLs, the rich segment experiences are curated to provide enough information that a user may not have to explore past the search result page—as opposed to clicking URLs to navigate to third party web sites.

A rich segment experience may include information related to a search query that is curated and presented in a visually distinct manner relative to other non-curated URL search results. In some examples, a rich segment experience 132 may include graphics, images, animations, and/or videos. A rich segment experience 132 may have visual characteristics that draw attention to the rich segment experience. For example, a rich segment experience 132 may be positioned prominently on the search result web page above other non-curated search results. As another example, a rich segment experience 132 may be positioned on a side panel of the search result web page. In some examples, a rich segment experience 132 may be formatted differently than other non-curated search results. For example, a rich segment experience 132 may be contained within a box or may be segregated from other search results by some form of border.

The search engine computing system 100 may be configured to maintain a plurality of rich segment experiences 132 in an experience database 130. Each different rich segment experience 132 may relate to a different topic, theme, subject, or other type of information. The experience database 130 may be configured to store any suitable number of different rich segment experiences 132.

The search engine computing system 100 may include a ranker 112 configured to rank a relevance of each search result entry relative to the search query, whether it is a rich segment experience or a non-curated search result, such as a URL to a web site. The ranker 112 may assign different rankings to different search result entries, and the different search result entries may be presented on the search result web page based on the ranking. The ranker 112 may be configured to rank the different search result entries according to any suitable ranking technique. In some implementations, the ranker 112 may be configured to rank the rich segment experiences 132 separately from the other search results.

In one example, the ranker 112 may be configured to selectively present different rich segment experiences 132 on the search result web page based on a triggering algorithm 140. The ranker 112 may use the triggering algorithm 140 to determine how relevant different rich segment experiences 132 stored in the experience database 130 are to a particular search query. The triggering algorithm 140 may include one or more thresholds for triggering presentation of a rich segment experience 132. Each rich segment experience 132 may provide, to the ranker 112, a confidence score 134 that is determined based on the search query.

Confidence scores may be generated in any suitable manner, e.g., using any suitable combination of state-of-the-art and/or future machine learning (ML), artificial intelligence (AI), and/or natural language processing (NLP) techniques. For example, confidence scores may be generated by an AI, ML, and/or NLP model based on input data including any suitable combination of the search query, personalization data for a user, and/or data related to candidate rich segment experiences to be provided for the search query. In some examples, the model may be trained to generate confidence scores with regard to a classification task, e.g., for classifying relevance, predicting user satisfaction, and/or correctly generating relevant rich segment experiences as compared to "ground truth" examples of relevant rich segment experiences. For example, the model may be given input data and configured to output a relevance score, user satisfaction score, and/or select a rich segment experience. The output of the model may be assessed according to a loss function (e.g., a loss function measuring accuracy of scoring and/or selection). The model may be configured to output one or more confidence values for the classification task (e.g., confidence values for different classification results regarding user satisfaction and/or relevance, confidence values for the relevance of different candidate rich segment experiences, etc.). Similarly, instead or in addition to using a loss function with regard to a classification task, the model may be trained via reinforcement learning with regard to reinforcement signals, e.g., with regard to user satisfaction or user-provided feedback regarding relevance of selected rich segment experiences. In either case, whether loss function or reinforcement learning is used, the system may be adjusted over time to "penalize" incorrect actions by adjusting parameters of the system so that the incorrect actions are less likely in the future given similar inputs, and to "reward" correct actions by adjusting parameters of the system so that the correct actions are more likely in the future. The loss function and/or reinforcement may be configured to more heavily reward and/or penalize answers in proportion to the confidence value. Accordingly, the confidence value may be adjusted based on the loss function, e.g., to penalize confident but incorrect answers, and/or to reward confident, correct answers. Accordingly, the system may be trained to emit a relatively high confidence value when it is likely to be correct, and to emit a relatively low confidence value when a correct answer cannot be confidently predicted.

In some examples, different rich segment experiences may determine confidence scores using different scoring techniques. The ranker 112 may be configured to compare the confidence score 134 to the threshold, and if the confidence score 134 is greater than the threshold, the rich segment experience 132 may be presented. On the other hand, if the confidence score is less than the threshold, then presentation of the rich segment experience 132 may be suppressed.

In some implementations, the ranker 112 optionally may be configured to position a rich segment experience on the search result web page based on the confidence score 134. As an example, a rich segment having a higher confidence score may be place more prominently on the search result page (e.g., at the top of the page above other search results).

As another example, a rich segment having a medium confidence score that is just high enough to exceed the threshold for presenting the rich segment experience may be placed less prominently on the search result web page (e.g., lower down on the page or on a side of the page).

Furthermore, in some examples where multiple rich segment experiences 132 are triggered, the ranker 112 may be configured to select a triggered rich segment experience having the highest confidence score 134 for presentation (or more prominent presentation). In some such examples, multiple rich segment experiences 132 may be presented on the search result web page. Further, in some examples, different portions of the search result web page may have different priority levels, such that the rich segment experience having the highest confidence score may be positioned in the highest priority position (e.g., at the top of the page) on the search result web page. The ranker 112 may traverse the list to position the different rich segment experiences at the different priority positions on the search result web page based on the confidence scores. A rich segment experience may be positioned on the search result web page in any suitable position based on the confidence score of the rich segment experience.

As discussed above, a searcher's interests may be used as a factor to decide whether or not to display a particular rich segment experience responsive to a search query. In some examples, the thresholds that are used by the triggering algorithm 140 to determine whether or not a rich segment experience is to be presented may be dependent upon whether or not a searcher previously has shown interest in, and has been associated with the rich segment experience. In some such examples, the ranker 112 may be configured to use a relaxed-trigger threshold if a unique identity 108 that provided the search query is associated with a rich segment experience. Further, the ranker 112 may be configured to use a stringent-trigger threshold that is greater than the relaxed-trigger threshold, if the unique identity 108 is not associated with the rich segment experience. For example, because a search query for "Ninja" is quite broad, a non-personalized, stringent-trigger threshold for triggering an "eSports" rich segment experience may be 0.8 or 80%. However, if the unique identity that provided the search query is previously associated with the "eSports" rich segment experience, then a relaxed-trigger threshold of 0.6 or 60% may trigger the "eSports" rich segment experience. The stringent-trigger threshold and the relaxed-trigger threshold may be set to any suitable thresholds for any suitable rich segment experiences. In some examples, trigger thresholds may be determined based on the search query. For example, broader search queries may have lower thresholds and narrower search queries may have higher thresholds.

Additionally or alternatively, in some examples, the confidence score 134 provided by a rich segment experience 132 may be increased or decreased based on whether or not a unique identity 108 is associated with the rich segment experience 132. For example, a confidence score for a rich segment experience may be increased based on a unique identity being associated with the rich segment experience. By using these different thresholds and/or varying confidence scores based on a searcher's interest in/association with a rich segment experience, the rich segment experience may be more likely to be triggered for presentation on the search result web page relative to other rich segment experiences in which the searcher has not previously shown interest.

A rich segment experience 132 may be associated with one or more unique identities 138 based on correlation criteria 136. In some examples, different rich segment experiences 132 may have different correlation criteria 136. Any suitable correlation criteria 136 may be used by a rich segment experience 132 to determine whether or not a unique identity 108 has shown interest in, and thus should be associated with the rich segment experience 132. For example, correlation criteria 136 may be based on natural language processing, machine learning, artificial intelligence, data mining, according to direct one-to-one matching, "fuzzy" matching (e.g., matching with at least a threshold similarity), and/or probabilistic matching. When a unique identity 108 satisfies correlation criteria 136 for a rich segment experience 132, the unique identity 108 may be associated with the rich segment experience 132 in the experience database 130. As a natural extension of this example, a cluster or group of associated unique identities 138 may be formed for each rich segment experience 132 and stored with the rich segment experience 132 in the experience database 130.

In one nonlimiting example, each rich segment experience 132 may be defined in terms of a set of descriptive keyword tags. Further, each unique identity 108 may have a set of descriptive keyword tags that is associated with the unique identity based on previous search behavior and/or browsing history 126. Each rich segment experience 132 may compare its set of keyword tags with keyword tags of each unique identity. When the set of keyword tags for a rich segment experience 132 matches (or matches within at least a threshold similarity) keyword tags associated with a unique identity 108, the correlation criteria 136 of the rich segment experience 132 may be satisfied and the unique identity 108 may be associated with the rich segment experience 132 in the experience database 130.

The search engine computing system 100 may include a search behavior/browsing history logging pipeline 114 that may track the search behavior/browsing history of each unique identity 108 to facilitate determining correlation between unique identities and rich segment experiences. The logging pipeline 114 may include a unique identity extractor 116 configured to identify a unique identity 108 that provides a search query from a client computer 102 to the search engine computing system 100. The logging pipeline 114 may include a search query tagger 118 configured to extract keywords from a search query. The search query tagger 118 may perform natural language processing (NLP) techniques on the search query, for example, a part of speech (POS) tagger may be used to derive keyword tags from the search query.

The logging pipeline 114 may include a search results tagger 120 configured to derive keywords tags from search behavior/browsing history. In particular, the search results tagger 120 may be configured to track which search results are selected from a search result web page (e.g., identify which URLs are clicked). Further, the search results tagger 120 may be configured to perform NLP techniques on the selected search results. For example, a text snippet may be extracted from a URL and a POS tagger may be used to derive keyword tags from the text snippet. The search results tagger 120 may be configured to derive keywords from rich segment experiences that are presented on the search result web page. The search results tagger 120 may be configured to derive keywords from search results on other granular search verticals such as news search results, image search results, video search results, shopping search results, recipe search results, etc.

The logging pipeline 114 optionally may include a search results filter 122 that may be configured to remove designated search results from being used to generate keyword tags for the unique identity 108. In some implementations, the search results filter 122 may be configured to filter out selected search results that are considered non-positive (e.g., that lead to abandonment) from being used to generate keyword tags for the unique identity. For example, the search results filter 122 may be configured to filter out selected search results where the dwell time is less than a threshold time. As an example, a searcher may click on a URL that causes a web site to be presented in the web browser, and the searcher may then quickly navigate back to the search result web page to select a different search result. The search results filter 122 may filter out the selected search result in this case. In some examples, the search results filter 122 may be configured to filter out other designated search results that may be deemed private or unwanted (as designated by the searcher or the computing system). As an example, the search results filter 122 may be configured to filter out search results relating to adult content. As another example, the search results filter 122 may be configured to filter out search results relating to private information (e.g., medical information).

The keyword tags and the other search behavior/browsing history information 126 tracked by the logging pipeline 114 for each unique identity 108 may be maintained in an identity database 124. The identity database 124 may be configured to store any suitable number of unique identities 108 and associated browsing history 126. The identity database 124 may store any suitable information relating to the unique identities 108. In some examples, each unique identity 108 may be associated with a different set of keyword tags aggregated for the unique identity 108 based on search behavior/browsing history in the identity database 124.

As discussed above, the set of keyword tags associated with each rich segment experience 132 may be compared to the keyword tags associated with each of the unique identities 108 to form different clusters of unique identities 138 that are interested in the different rich segment experiences 132. Each cluster of unique identities 138 may be associated a rich segment experience in the experience database 130. Alternatively or additionally, a different cluster of rich segment experiences 128 may be associated with each unique identity 108 in the identity datastore 124. In either case, the associated information may be provided to the ranker 112, and the ranker 112 may tune the triggering algorithm 140—e.g., by using relaxed/stringent triggering threshold and/or adjusting confidence scores based on such information. By tuning the triggering algorithm 140 in this manner, rich segment experiences for which a searcher has previously expressed interest may be more likely to be presented on the search result web page relative to other rich segment experiences for which the search has not previously expressed interest. In this way, the search results may be more likely to be useful and in line with the expectations of the searcher.

Figure 2:
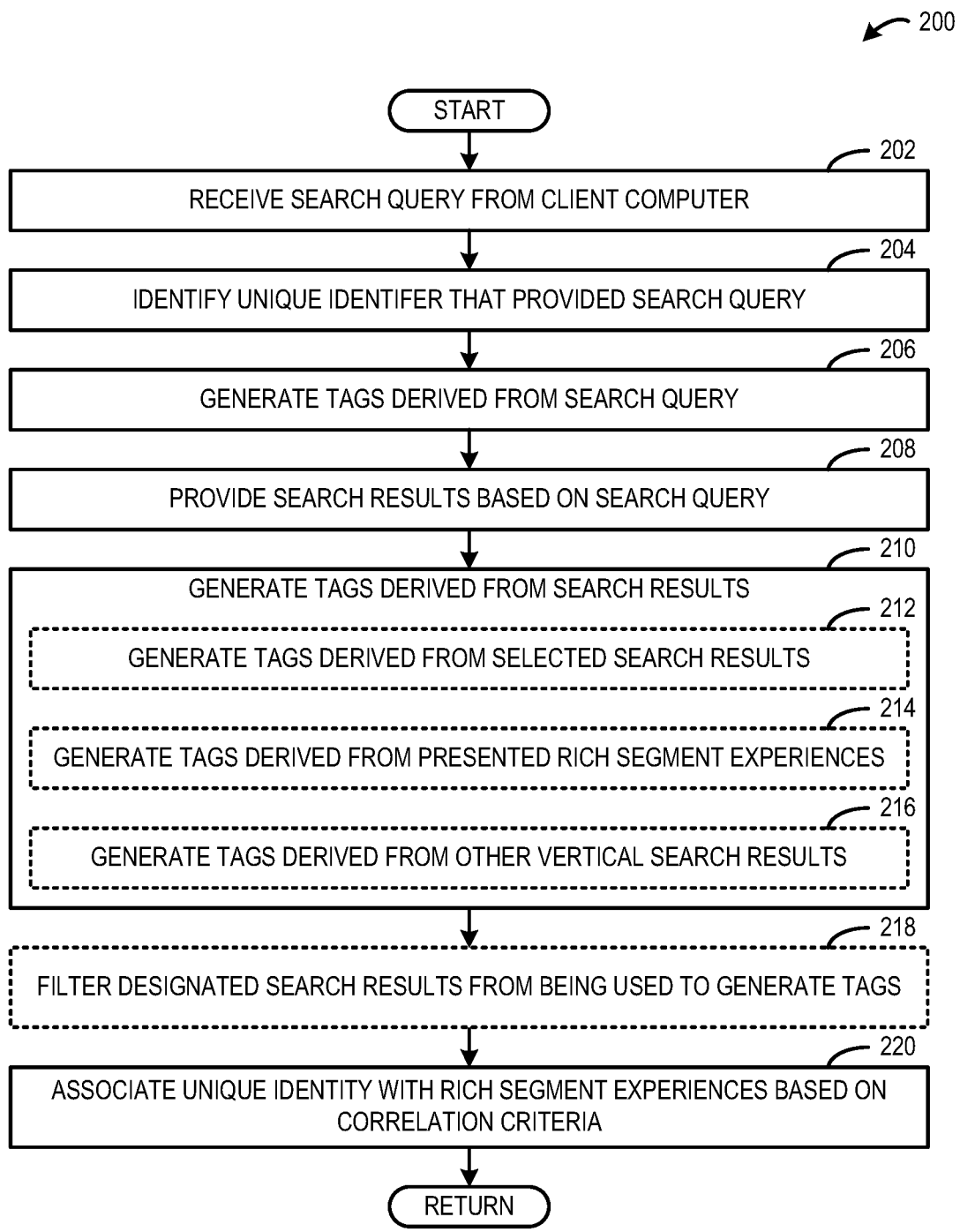
FIG. 2 is a flowchart depicting aspects of an example method for logging browsing history information for a unique identity.

FIG. 2 depicts aspects of an example method 200 for logging browsing history information for a unique identity. The method 200 may be performed by any suitable computer system, e.g., by search engine computing system 100 and/or client computers 102. For example, the search engine computing system 100 may instantiate the logging pipeline 114 to perform the method 200.

At 202, the method 200 includes receiving a search query from a client computer. At 204, the method 202 includes identifying a unique identity that provided the search query. In some examples, the unique identity may be an AND that is associated with a searcher and that may be used across multiple different client computers. In some examples, the unique identity may be a Client ID associated with a particular client computer.

At 206, the method 200 includes generating keyword tags derived from the search query. Such keyword tags may be included in a set of keyword tags associated with the unique identity that characterize the interests of the unique identity.

At 208, the method 200 includes providing search results based on the search query on a search result web page presented in a web browser of the client computer.

At 210, the method 200 includes generating keyword tags derived from search results. In some implementations, at 212, the method optionally may include generating keyword tags derived from selected search results. As an example, the keyword tags may be derived from text snippets included in a selected URL. As another example, the keyword tags may be derived from information on a web site selected from the search result web page. In some implementations, at 214, the method 200 optionally may include generating keyword tags derived from rich segment experiences presented on the search result web page. In some implementations, at 216, the method 200 optionally may include generating keyword tags derived from other vertical search results (e.g., image search, video search, person search, recipe search). Such keyword tags may be included in the set of keyword tags associated with the unique identity that characterize the interests of the unique identity.

At 218, the method 200 optionally may include filtering designated search results from being used to generate the keyword tags. As an example, selected search results that are considered non-positive (e.g., that lead to abandonment) may be filtered from being used to generate keyword tags for the unique identity. Other non-limiting examples include filtering search results relating to adult content and private information.

At 220, the method 200 includes associating the unique identity with one or more rich segment experiences based on correlation criteria. As an example, if a set of keyword tags associated with a rich segment experience at least partially matches keyword tags associated with the unique identity, then the correlation criteria is satisfied and the unique identify is associated with the rich segment experience.

The method 200 may be performed for each of a plurality of unique identities to determine the interests of each unique identity and the rich segment experiences associated with each unique identity. Such information may be used to provide different types of search engine results to different searchers as discussed herein.

Figure 3:
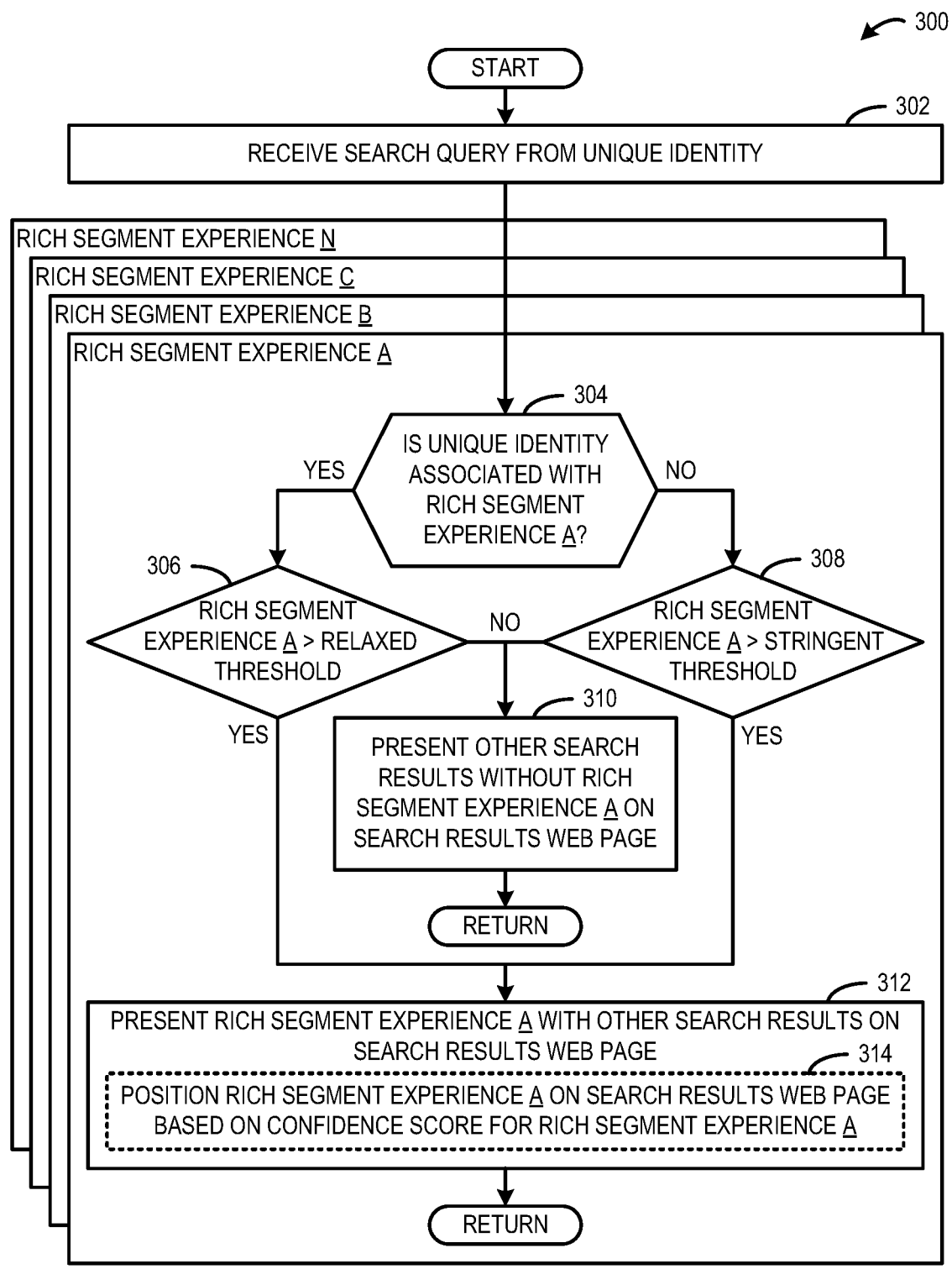
FIG. 3 is a flowchart depicting aspects of an example method for selectively providing different types of search engine results to different searchers.

FIG. 3. depicts aspects of an example method 300 for selectively providing different types of search engine results to different searchers. The method 300 may be performed by any suitable computer system, e.g., by search engine computing system 100 and/or client computers 102.

At 302, the method 300 includes receiving a search query from a unique identity. The method 300 may perform in parallel a series of method steps for each of a plurality of rich segment experiences to determine whether or not the rich segment experience should be presented on a search result web page based on the search query. For each rich segment experience, at 304, the method 300 includes determining whether the unique identity is associated with the rich segment experience. If the unique identity is associated with the rich segment experience, then the method 300 moves to 306. Otherwise, the unique identity is not associated with the rich segment experience, and the method 300 moves to 308.

At 306, the method 300 includes determining whether the rich segment experience is greater than a relaxed-trigger threshold. For example, the rich segment experience may generate a confidence score based on the search query and the confidence score may be compared to the relaxed-trigger threshold. If the rich segment experience is greater than the relaxed-trigger threshold, the method 300 moves to 312. Otherwise, the method 300 moves to 310.

At 308, the method 300 includes determining whether the rich segment experience is greater than a stringent-trigger threshold that is greater than the relaxed-trigger threshold. For example, the rich segment experience may generate a confidence score based on the search query and the confidence score may be compared to the stringent-trigger threshold. If the rich segment experience is greater than the stringent-trigger threshold, the method 300 moves to 312. Otherwise, the method 300 moves to 310.

At 310, the method 300 includes presenting other search results without presenting the rich segment experience on a search result web page. For example, the other search results may include URLs to relevant web sites and/or a different, more relevant rich segment experience.

At 312, the method 300 includes presenting the rich segment experience with other search results on the search result web page. In some examples, the rich segment experience optionally may be presented on the search result web page without any non-curated search results (e.g., URL links) or any other search results.

In some implementations, at 314, the method 300 optionally may include positioning the rich segment experience on the search result web page based on a confidence score for the rich segment experience. For example, the higher the confidence score for the rich segment experience, the higher on the search results web page the rich segment experience may be positioned.

Method steps 304-314 may be repeated for each of the plurality of rich segment experiences to determine whether or not each rich segment experience is to be presented on the search result web page.

FIGS. 4A-4F show an example search result web page with different search results that selectively include rich segment experiences based on the search behavior/browsing history of different unique identities. In particular, search results are shown for the same search queries performed by unique identity A and unique identity B. Unique identity A has an interest in the collectible card game, Magic the Gathering, which has been determined based on previous search behavior/browsing history for unique identity A. Unique identity B has an interest in the Orlando Magic basketball team, which has been determined based on previous search behavior/browsing history for unique identity B.

Figure 4A:
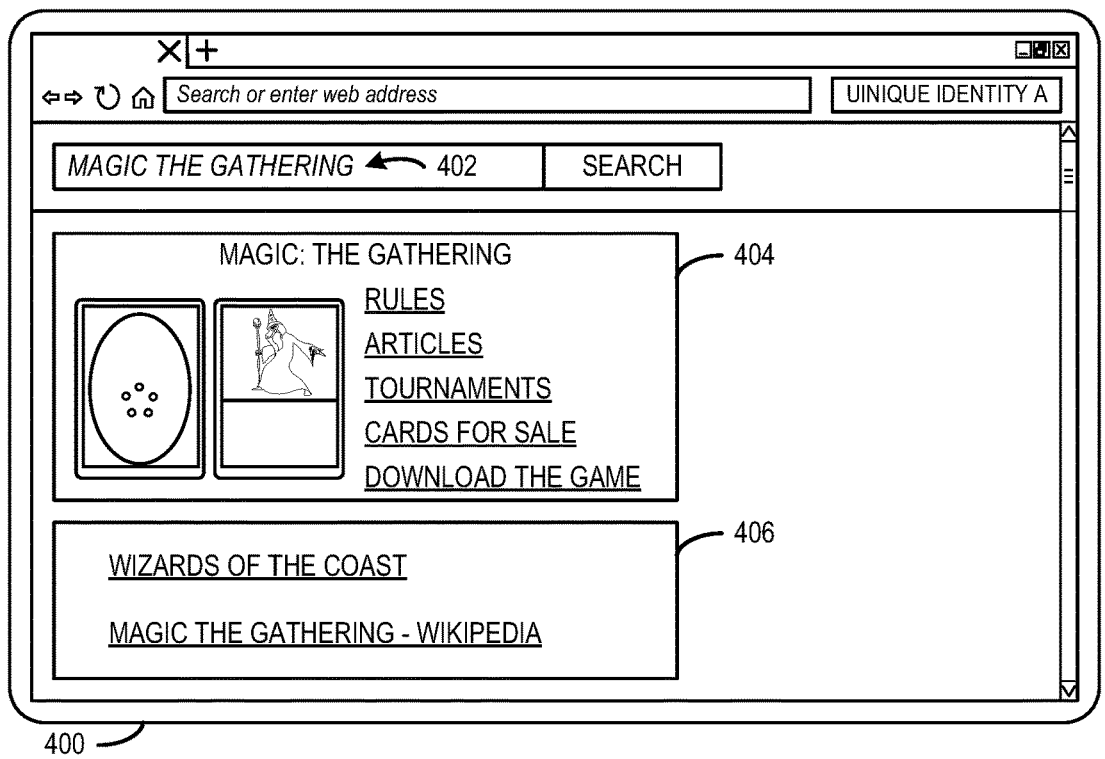
FIGS. 4A-4F show example search result web pages with different search results that selectively include rich segment experiences based on the browsing history of different unique identities.

In FIG. 4A, a search results web page 400 includes a search query 402 for "MAGIC THE GATHERING" performed by unique identity A. The search query 402 may be provided as input to a triggering algorithm. Each of a plurality of different rich segment experiences may determine a confidence score based on the search query 402. The triggering algorithm may be configured to compare the plurality of confidence scores to different trigger thresholds. In particular, confidence scores for rich segment experiences that are associated with unique identity A may be compared to a relaxed-trigger threshold, and confidence scores for rich segment experiences that are not associated with unique identity A may be compared to a stringent-trigger threshold.

A rich segment experience 404 for "MAGIC: THE GATHERING" is associated with unique identity A, because unique identity A is interested in this type of collectible card game experience. As such, a confidence score for the rich segment experience 404 is compared to the relaxed-trigger threshold. The confidence score for the rich segment experience 404 exceeds the relaxed-trigger threshold, which triggers the rich segment experience 404 to be presented on the search result web page 400 for unique identity A.

The rich segment experience 404 includes images of different cards as well as other curated information relating to rules of the game, articles about the game, tournaments to play the game, cards for sale, and downloading a digital version of the game. This curated information may be retrieved from different web sites and presented in the rich segment experience 404. Additionally, other non-curated search results 406 are presented on the search result web page 400 based on the search query 402 performed by unique identity A. The other non-curated search results 406 include URLs to different relevant web sites. In some examples, the other non-curated search results 406 may be personalized for unique identity A. In other examples, the other non-curated search results 406 may be non-personalized, such that the same search results are presented to different unique identities based on the search query 402.

Furthermore, a different rich segment experience 412 for "ORLANDO MAGIC BASKETBALL TEAM" (shown in FIG. 4D) is not associated with unique identity A, because unique identity A has not previously demonstrated interest (e.g., via prior search and/or browsing activity) in this basketball team. As such, a confidence score for the rich segment experience 412 is compared to the stringent-trigger threshold. The confidence score for the rich segment experience 412 does not exceed the stringent-trigger threshold and thus is not presented on the search result web page 400 for unique identity A based on the search query 402.

Figure 4B:
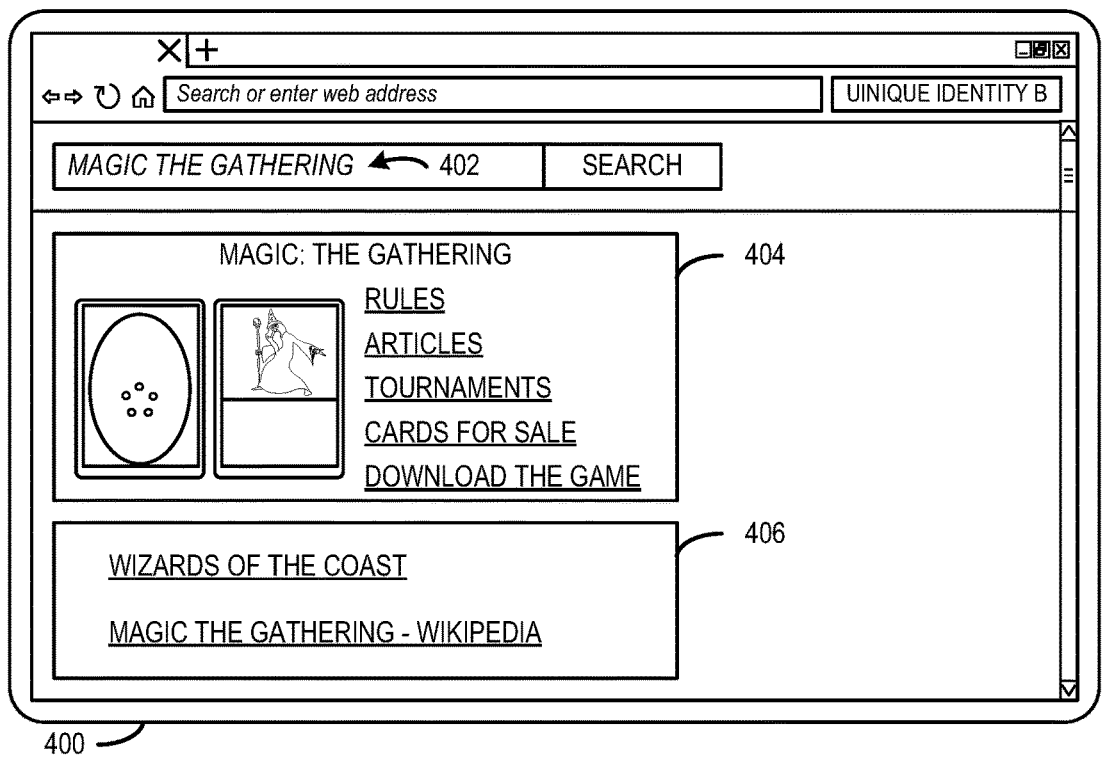

In FIG. 4B, the search results web page 400 includes the same search query 402 for "MAGIC THE GATHERING" that was performed by unique identity A in FIG. 4A, but instead is performed by unique identity B. The rich segment experience 404 for "MAGIC: THE GATHERING" is not associated with unique identity B, because unique identity B has not previously demonstrated interest (e.g., via prior search and/or browsing activity) in this type of collectible card game experience. As such, the confidence score for the rich segment experience 404 is compared to the stringent-trigger threshold. The confidence score for the rich segment experience 404 exceeds the stringent-trigger threshold, which triggers the rich segment experience 404 to be presented on the search result web page 400 for unique identity B. Additionally, other non-curated search results 408 are presented on the search result web page 400 based on the search query 402 performed by unique identity B.

Furthermore, the rich segment experience 412 for "ORLANDO MAGIC BASKETBALL TEAM" (shown in FIG. 4D) is associated with unique identity B, because unique identity B is interested in this basketball team. As such, the confidence score for the rich segment experience 412 is compared to the relaxed-trigger threshold. The confidence score for the rich segment experience 412 does not exceed the relaxed-trigger threshold and thus is not presented on the search result web page 400 for unique identity B based on the search query 402.

Note that FIG. 4B shows that even if a unique identity is previously associated with the rich segment experience 412 for "ORLANDO MAGIC BASKETBALL TEAM", the unique identity may not be provided that rich segment experience if the search query is sufficiently specific towards another rich segment experience (e.g., the rich segment experience 404). Further note that FIGS. 4A and 4B collectively show that the same rich segment experience may be provided to different unique identities having different interests that enter the same search query if that rich segment experience is sufficiently specific to that search query.

Figure 4C:
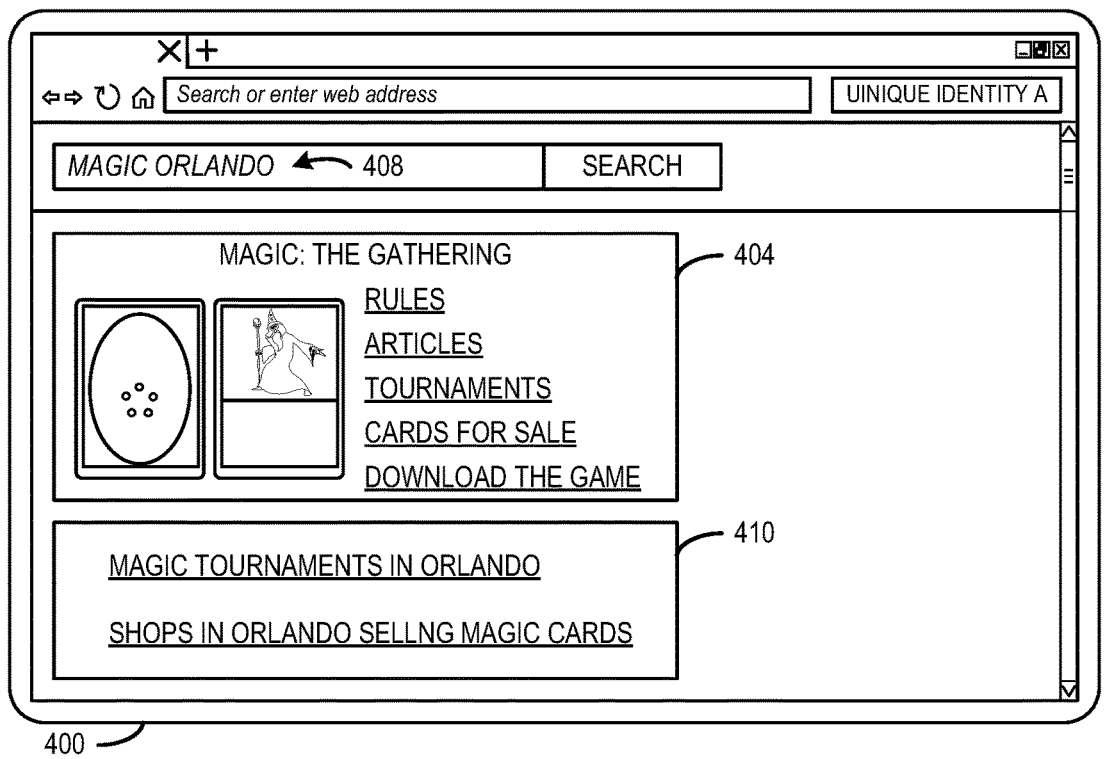

In FIG. 4C, the search results web page 400 includes a search query 408 for "MAGIC ORLANDO" performed by unique identity A. The confidence score for the rich segment experience 404 for "MAGIC: THE GATHERING" is compared to the relaxed-trigger threshold, because the rich segment experience 404 is associated with unique identity A. The confidence score for the rich segment experience 404 exceeds the relaxed-trigger threshold, which triggers the rich segment experience 404 to be presented on the search result web page 400 for unique identity A. Additionally, other non-curated search results 410 are presented on the search result web page 400 based on the search query 408 performed by unique identity A. The other search results 410 include URLs to different relevant web sites for the search query 408 including tournaments to play the card game in Orlando and shops that sell the card game in Orlando.

Furthermore, the confidence score for the rich segment experience 412 for "ORLANDO MAGIC BASKETBALL TEAM" (shown in FIG. 4D) is compared to the stringent-trigger threshold, because the rich segment experience 412 is not associated with unique identity A. The confidence score for the rich segment experience 412 does not exceed the stringent-trigger threshold and thus is not presented on the search result web page 400 for unique identity A based on the search query 408.

Figure 4D:
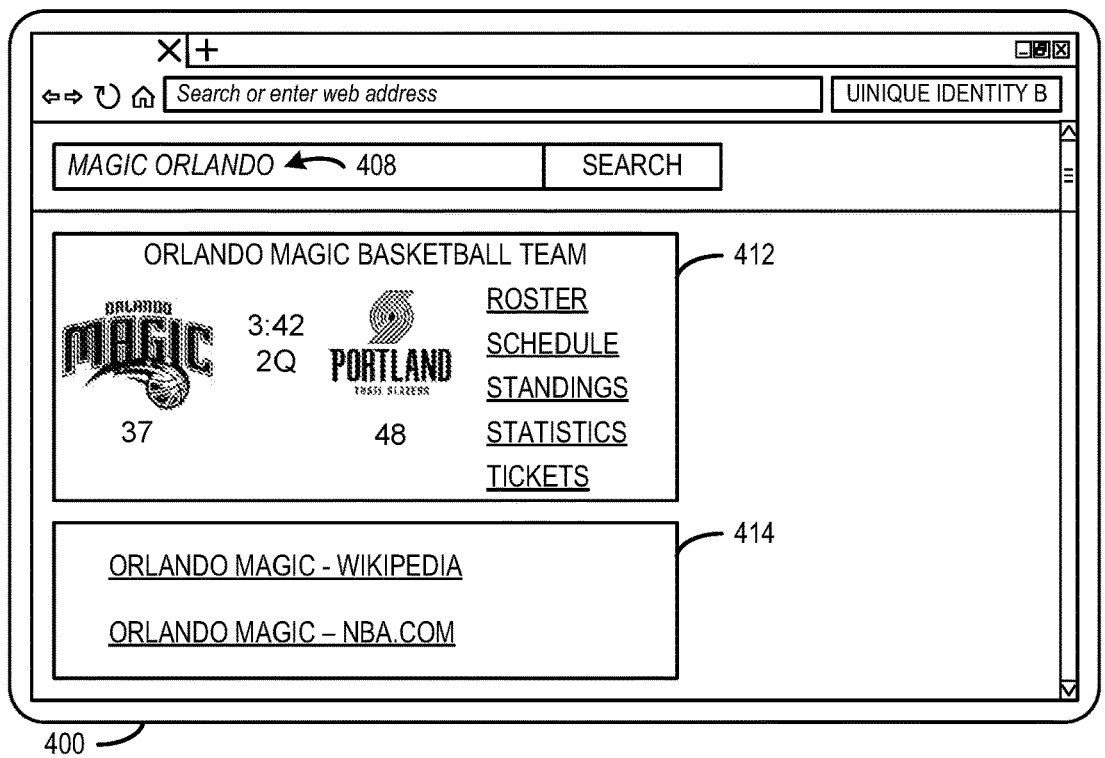

In FIG. 4D, the search results web page 400 includes the search query 408 for "MAGIC ORLANDO" performed by unique identity B. The confidence score for the rich segment experience 412 for "ORLANDO MAGIC BASKETBALL TEAM" is compared to the relaxed-trigger threshold, because the rich segment experience 412 is associated with identity B. The rich segment experience 412 has a confidence score that exceeds the relaxed-trigger threshold, which triggers the rich segment experience 412 to be presented on the search result web page 400 for unique identity B.

The rich segment experience 412 includes the score of the current game being played by the Orlando Magic basketball team, as well as other curated information relating to the roster, schedule, standings, statistics and tickets for the basketball team. This curated information may be retrieved from different web sites and presented in the rich segment experience 412. Additionally, other non-curated search results 414 are presented on the search result web page 400 based on the search query 408 performed by unique identity B. The other non-curated search results 414 include URLs to different relevant web sites for the search query 416.

Furthermore, the rich segment experience 404 for "MAGIC: THE GATHERING" (shown in FIG. 4C) is compared to the stringent-trigger threshold, because the rich segment experience 404 is not associated with unique identity B. The confidence score for the rich segment experience 404 does not exceed the stringent-trigger threshold and thus is not presented on the search result web page 400 for unique identity B based on the search query 408.

Note that FIGS. 4C and 4D collectively show that different rich segment experiences may be provided to different unique identities even if the different unique identities enter the same search query based on those unique identities' prior associations with the different rich segment experiences.

Figure 4E:
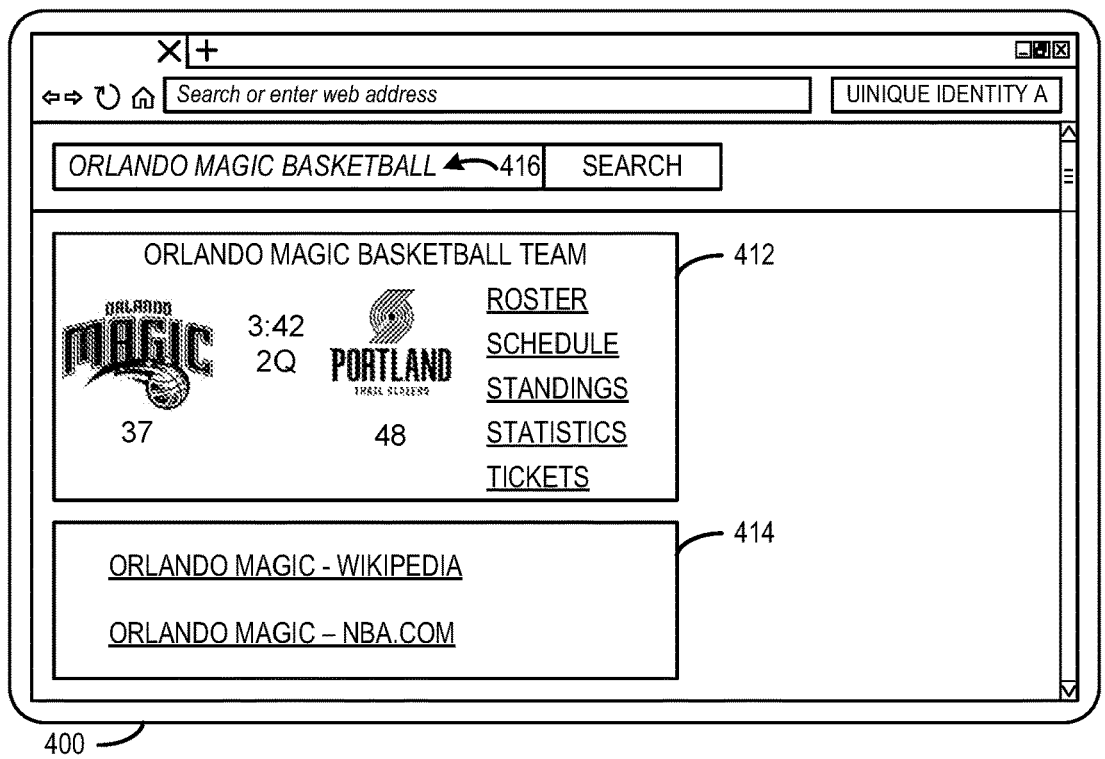

In FIG. 4E, the search results web page 400 includes a search query 416 for "ORLANDO MAGIC BASKET- BALL" performed by unique identity A. The confidence score for the rich segment experience 412 for "ORLANDO MAGIC BASKETBALL TEAM" is compared to the stringent-trigger threshold, because the rich segment experience 412 is not associated with unique identity A. The confidence score for the rich segment experience 412 exceeds the stringent-trigger threshold, which triggers the rich segment experience 412 to be presented on the search result web page 400 for unique identity A. Additionally, other non-curated search results 414 are presented on the search result web page 400 based on the search query 416 performed by unique identity A. The other non-curated search results 414 include URLs to different relevant web sites based on the search query 416.

Furthermore, the rich segment experience 404 for "MAGIC: THE GATHERING" (shown in FIG. 4C) is compared to the relaxed-trigger threshold, because the rich segment experience 404 is associated with unique identity A. The confidence score for the rich segment experience 404 does not exceed the relaxed-trigger threshold and thus is not presented on the search result web page 400 for unique identity A based on the search query 416.

Note that FIG. 4E shows that even if a unique identity is previously associated with the rich segment experience 404 for "MAGIC: THE GATHERING", the unique identity may not be provided that rich segment experience if the search query is sufficiently specific towards another rich segment experience (e.g., the rich segment experience 412).

Figure 4F:
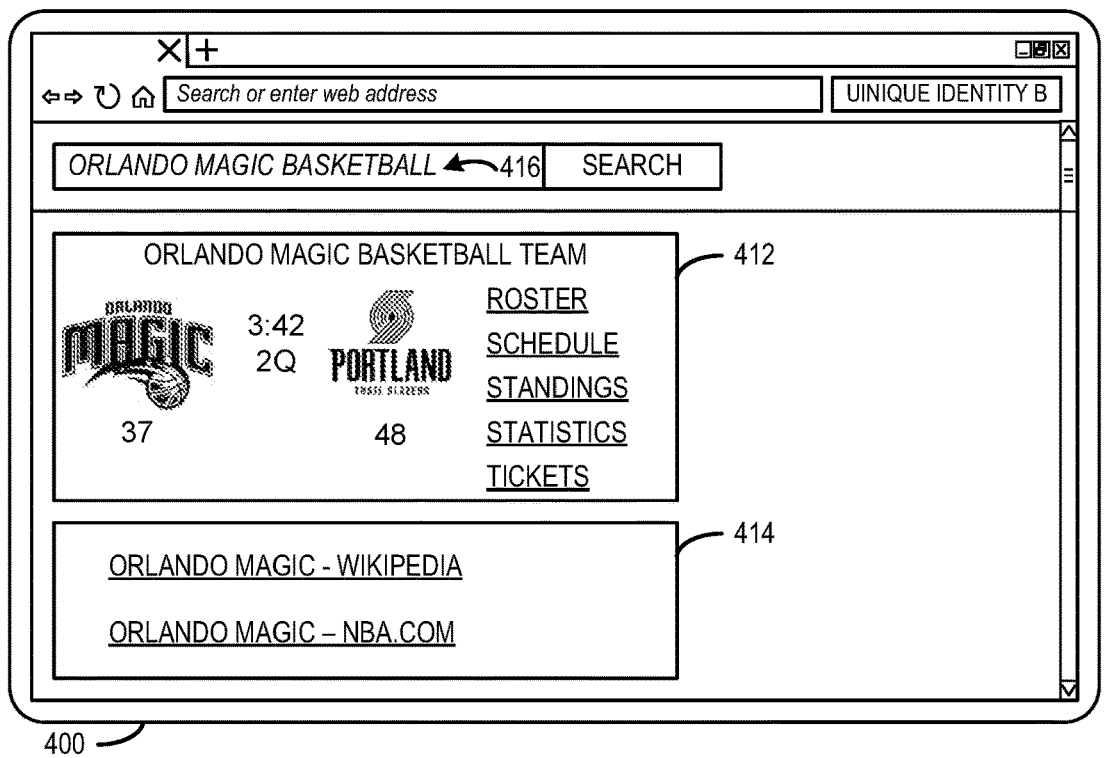

In FIG. 4F, the search results web page 400 includes the search query 416 for "ORLANDO MAGIC BASKETBALL" performed by unique identity B. The confidence score for the rich segment experience 412 for "ORLAND MAGIC BASKETBALL TEAM" is compared to the relaxed-trigger threshold, because the rich segment experience 412 is associated with unique identity B. The confidence score for the rich segment experience 412 exceeds the relaxed-trigger threshold, which triggers the rich segment experience 412 to be presented on the search result web page 400 for unique identity B. Additionally, other non-curated search results 414 are presented on the search result web page 400 based on the search query 416 performed by unique identity B.

Furthermore, the rich segment experience 404 for "MAGIC: THE GATHERING" (shown in FIG. 4C) is compared to the stringent-trigger threshold, because the rich segment experience 404 is not associated with unique identity B. The confidence score for the rich segment experience 404 does not exceed the stringent-trigger threshold and thus is not presented on the search result web page 400 for unique identity B based on the search query 416.

Note that FIGS. 4E and 4F collectively show that the same rich segment experience may be provided to different unique identities having different interests that enter the same search query if that rich segment experience is sufficiently specific to that search query.

Although the concepts described herein are directed to presenting different search results to different searchers on a search result web page, it will be appreciated that the different search results may take any other suitable form. For example, a rich segment experience may be a Natural Language result that is spoken (e.g., by a personal assistant Alexa/Siri/Cortana).

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 5:
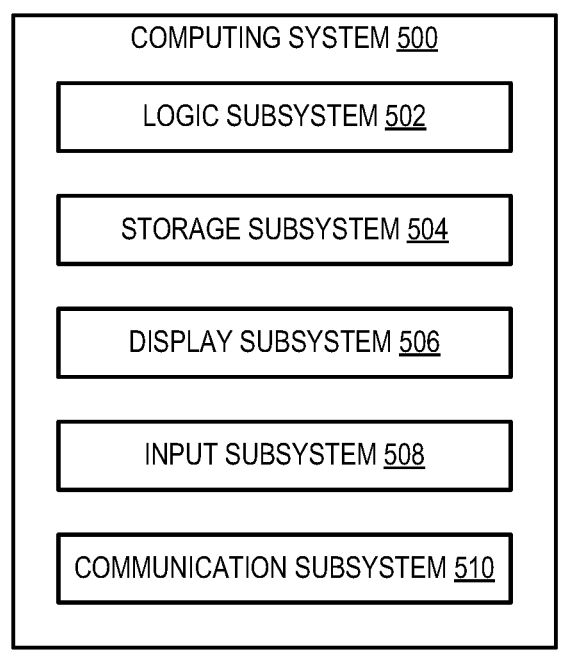
FIG. 5 schematically shows an example computing system.

FIG. 5 schematically shows a simplified representation of a computing system 500 configured to provide any to all of the compute functionality described herein. Computing system 500 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices. For example, computing system 500 may include any combination of logic subsystems, storage subsystems, and/or other subsystems of one or more of the search engine computing system 100, client computers 102, service endpoint 120, search results provider 110, identity datastore 124, and experience database 130.

Computing system 500 includes a logic subsystem 502 and a storage subsystem 504. Computing system 500 may optionally include an input/output subsystem 506 (e.g., comprising one or more input devices or sensors, and one or more output devices such as a graphical display and/or audio speakers), communication subsystem 508, and/or other subsystems not shown in FIG. 5.

Logic subsystem 502 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 504 includes one or more physical devices configured to temporarily and/or permanently hold computer information such as data and instructions executable by the logic subsystem. When the storage subsystem includes two or more devices, the devices may be collocated and/or remotely located. Storage subsystem 504 may include volatile, nonvolatile, dynamic, static, read/write, read-only, random-access, sequential-access, location-addressable, file-addressable, and/or content-addressable devices. Storage subsystem 504 may include removable and/or built-in devices. When the logic subsystem executes instructions, the state of storage subsystem 504 may be transformed—e.g., to hold different data.

Aspects of logic subsystem 502 and storage subsystem 504 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to hardware and any software, instructions, and/or other components cooperating with such hardware to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., computer service) cooperating with a remote component (e.g., cloud computing service). The software and/or other instructions that give a particular machine its functionality may optionally be saved as an unexecuted module on a suitable storage device. Non-limiting examples of machines which may be instantiated by computing system 500 according to the present disclosure include web browser 106, search results provider 110, ranker 112, and components of logging pipeline 114.

Machines according to the present disclosure may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process. For example, machine learning training techniques may be used to mine user approval/disapproval signals, e.g., to determine whether to add new query blacklist entries, site rules, and/or pattern rules for suppressing query answers.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

The methods and processes disclosed herein may be configured to give users and/or any other humans control over any private and/or potentially sensitive data. Whenever data is stored, accessed, and/or processed, the data may be handled in accordance with privacy and/or security standards. When user data is collected, users or other stakeholders may designate how the data is to be used and/or stored. Whenever user data is collected for any purpose, the user owning the data should be notified, and the user data should only be collected when the user provides affirmative consent. If data is to be collected, it can and should be collected with the utmost respect for user privacy. If the data is to be released for access by anyone other than the user or used for any decision-making process, the user's consent may be collected before using and/or releasing the data. Users may opt-in and/or opt-out of data collection at any time. After data has been collected, users may issue a command to delete the data, and/or restrict access to the data. All potentially sensitive data optionally may be encrypted and/or, when feasible anonymized, to further protect user privacy. Users may designate portions of data, metadata, or statistics/results of processing data for release to other parties, e.g., for further processing. Data that is private and/or confidential may be kept completely private, e.g., only decrypted temporarily for processing, or only decrypted for processing on a user device and otherwise stored in encrypted form. Users may hold and control encryption keys for the encrypted data. Alternately or additionally, users may designate a trusted third party to hold and control encryption keys for the encrypted data, e.g., so as to provide access to the data to the user according to a suitable authentication protocol.

When the methods and processes described herein incorporate ML and/or AI components, the ML and/or AI components may make decisions based at least partially on training of the components with regard to training data. Accordingly, the ML and/or AI components can and should be trained on diverse, representative datasets that include sufficient relevant data for diverse users and/or populations of users. In particular, training data sets should be inclusive with regard to different human individuals and groups, so that as ML and/or AI components are trained, performance is improved with regard to the user experience of the users and/or populations of users.

For example, a dialogue system according to the present disclosure may be trained to interact with different populations of users, using language models that are trained to work well for those populations based on language, dialect, accent, and/or any other features of speaking style of the population.

ML and/or AI components may additionally be trained to make decisions so as to minimize potential bias towards human individuals and/or groups. For example, when AI systems are used to assess any qualitative and/or quantitative information about human individuals or groups, they may be trained so as to be invariant to differences between the individuals or groups that are not intended to be measured by the qualitative and/or quantitative assessment, e.g., so that any decisions are not influenced in an unintended fashion by differences among individuals and groups.

ML and/or AI components can and should be designed to provide context as to how they operate as much as is possible, so that implementers of ML and/or AI systems can be accountable for decisions/assessments made by the systems. For example, ML and/or AI systems should have replicable behavior, e.g., when they make pseudo-random decisions, random seeds should be used and recorded to enable replicating the decisions later. As another example, data used for training and/or testing ML and/or AI systems should be curated and maintained to facilitate future investigation of the behavior of the ML and/or AI systems with regard to the data. Furthermore, ML and/or AI systems can and should be continually monitored to identify potential bias, errors, and/or unintended outcomes.

When included, input/output subsystem 506 may be used to present a visual representation of data held by storage subsystem 504. This visual representation may take the form of a graphical user interface (GUI). Input/output subsystem 506 may include one or more display devices utilizing virtually any type of technology. In some implementations, input/output subsystem 506 may include one or more virtual-, augmented-, or mixed reality displays. Input/output subsystem 506 may be used to visually present content, such as browser 106 and search results displayed in pages of browser 106. Input/output subsystem 506 may include one or more microphone and/or speaker devices configured to receive and/or output audio. In some examples, microphone devices may be used to receive speech audio input which may be processed (e.g., using natural language processing and/or machine learning techniques) to receive user queries, determine user intent, etc. For example, speech audio input may be processed to control browser 106. For example, speech audio input may be processed to recognize user queries for a search engine, e.g., in addition or instead of user input via text in a search bar. In some examples, speaker devices may be used to output speech audio, e.g., to provide information to the user, interact with the user in spoken conversation, etc. In some examples, browser 106 may be configured to present content in the form of speech audio. For example, browser 106 may present search results by outputting, for each result entry in the search results, speech audio indicating the result entry. For example, when browser 106 presents search results including a query answer and a plurality of other result entries, browser 106 may output speech audio reciting the query answer, and output further speech audio listing a title and/or summary of each of the plurality of other result entries.

When included, input/output subsystem may further comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 508 may be configured to communicatively couple computing system 500 with one or more other computing devices. Communication subsystem 508 may include wired and/or wireless communication devices compatible with one or more different communication protocols. The communication subsystem may be configured for communication via personal-, local- and/or wide-area networks.

Language models may utilize vocabulary features to guide sampling/searching for words for recognition of speech. For example, a language model may be at least partially defined by a statistical distribution of words or other vocabulary features. For example, a language model may be defined by a statistical distribution of n-grams, defining transition probabilities between candidate words according to vocabulary statistics. The language model may be further based on any other appropriate statistical features, and/or results of processing the statistical features with one or more machine learning and/or statistical algorithms (e.g., confidence values resulting from such processing). In some examples, a statistical model may constrain what words may be recognized for an audio signal, e.g., based on an assumption that words in the audio signal come from a particular vocabulary.

Alternately or additionally, the language model may be based on one or more neural networks previously trained to represent audio inputs and words in a shared latent space, e.g., a vector space learned by one or more audio and/or word models (e.g., wav2letter and/or word2vec). Accordingly, finding a candidate word may include searching the shared latent space based on a vector encoded by the audio model for an audio input, in order to find a candidate word vector for decoding with the word model. The shared latent space may be utilized to assess, for one or more candidate words, a confidence that the candidate word is featured in the speech audio.

The language model may be used in conjunction with an acoustical model configured to assess, for a candidate word and an audio signal, a confidence that the candidate word is included in speech audio in the audio signal based on acoustical features of the word (e.g., mel-frequency cepstral coefficients, formants, etc.). Optionally, in some examples, the language model may incorporate the acoustical model (e.g., assessment and/or training of the language model may be based on the acoustical model). The acoustical model defines a mapping between acoustic signals and basic sound units such as phonemes, e.g., based on labelled speech audio. The acoustical model may be based on any suitable combination of state-of-the-art or future machine learning (ML) and/or artificial intelligence (AI) models, for example: deep neural networks (e.g., long short-term memory, temporal convolutional neural network, restricted Boltzmann machine, deep belief network), hidden Markov models (HMM), conditional random fields (CRF) and/or Markov random fields, Gaussian mixture models, and/or other graphical models (e.g., deep Bayesian network). Audio signals to be processed with the acoustic model may be pre-processed in any suitable manner, e.g., encoding at any suitable sampling rate, Fourier transform, band-pass filters, etc. The acoustical model may be trained to recognize the mapping between acoustic signals and sound units based on training with labelled audio data. For example, the acoustical model may be trained based on labelled audio data comprising speech audio and corrected text, in order to learn the mapping between the speech audio signals and sound units denoted by the corrected text. Accordingly, the acoustical model may be continually improved to improve its utility for correctly recognizing speech audio.

In some examples, in addition to statistical models, neural networks, and/or acoustical models, the language model may incorporate any suitable graphical model, e.g., a hidden Markov model (HMM) or a conditional random field (CRF). The graphical model may utilize statistical features (e.g., transition probabilities) and/or confidence values to determine a probability of recognizing a word, given the speech audio and/or other words recognized so far. Accordingly, the graphical model may utilize the statistical features, previously trained machine learning models, and/or acoustical models to define transition probabilities between states represented in the graphical model.

In an example, a method of selectively providing different types of search engine results to different searchers comprises for each of a plurality of different unique identities, logging a browsing history for the unique identity, for each of a plurality of different rich segment experiences configured to present curated segment-specific information with other search results on a search result web page, associating the unique identity with the rich segment experience responsive to the browsing history for the unique identity satisfying correlation criteria of the rich segment experience, responsive to receiving a search query from the unique identity previously associated with the rich segment experience, presenting the rich segment experience with other search results on the search result web page, and responsive to receiving the search query from a different unique identity not previously associated with the rich segment experience, presenting other search results without the rich segment experience on the search result web page. In this example and/or other examples, the rich segment experience may be presented with other search results only if the search query received from the unique identity exceeds a relaxed-trigger threshold. In this example and/or other examples, the method may further comprise presenting the rich segment experience with other search results if the search query received from the different unique identity exceeds a stringent-trigger threshold greater than the relaxed-trigger threshold. In this example and/or other examples, the rich segment experience may not be presented with other search results if the search query received from the unique identity does not exceed a relaxed-trigger threshold. In this example and/or other examples, logging the browsing history for the unique identity may include generating keyword tags derived from one or more of previous search queries, previously selected search results, and previously presented rich segment experiences. In this example and/or other examples, each rich segment experience may be defined in terms of a different set of keyword tags, and the correlation criteria may be satisfied based on a set of keyword tags associated with the rich segment experience matching keyword tags associated with the unique identity. In this example and/or other examples, logging the browsing history for the unique identity may include filtering out previously selected search results having dwell times that are less than a threshold time from being used to generate keyword tags for the unique identity. In this example and/or other examples, the method may further comprise generating a confidence score for the rich segment experience based on the search query, and wherein the rich segment experience is positioned on the search result web page based on the confidence score. In this example and/or other examples, the other search results may be individualized for the unique identity based on the browsing history for the unique identity. In this example and/or other examples, the unique identity may be associated with a user identity across different computing devices. In this example and/or other examples, the unique identity may be associated with a particular computing device.

In an example, a method of selectively providing different types of search engine results comprises logging a browsing history for a unique identity, for each of a plurality of different rich segment experiences configured to present curated segment-specific information with other search results on a search result web page, associating the unique identity with the rich segment experience responsive to the browsing history for the unique identity satisfying correlation criteria of the rich segment experience, in response to receiving a search query from the unique identity, presenting a rich segment experience with other search results on the search result web page based on the rich segment experience being previously associated with the unique identity and the rich segment experience exceeding a relaxed-trigger threshold, presenting other search results on the search result web page without the rich segment experience based on the rich segment experience being previously associated with the unique identity and the rich segment experience not exceeding the relaxed-trigger threshold, presenting the rich segment experience with other search results on the search result web page based on the rich segment experience not being previously associated with the unique identity and the rich segment experience exceeding a stringent-trigger threshold, and presenting other search results on the search result web page without the rich segment experience based on the rich segment experience not being previously associated with the unique identity and the rich segment experience not exceeding the stringent-trigger threshold. In this example and/or other examples, logging the browsing history for the unique identity may include generating keyword tags derived from one or more of previous search queries, previously selected search results, previously presented rich segment experiences. In this example and/or other examples, each rich segment experience may be defined in terms of a different set of keyword tags, and the correlation criteria may be satisfied based on a set of keyword tags associated with the rich segment experience matching keyword tags associated with the unique identity. In this example and/or other examples, logging the browsing history for the unique identity may include filtering out previously selected search results having dwell times that are less than a threshold time from being used to generate keyword tags for the unique identity. In this example and/or other examples, the method may further comprise generating a confidence score for the rich segment experience based on the search query, and the rich segment experience may be positioned on the search result web page based on the confidence score.

In an example, a method of selectively providing different types of search engine results to different searchers comprises for each of a plurality of different unique identities, logging a browsing history for the unique identity, for each of a plurality of different rich segment experiences configured to present curated segment-specific information with other search results on a search result web page, associating the unique identity with the rich segment experience responsive to the browsing history for the unique identity satisfying correlation criteria of the rich segment experience, responsive to receiving a search query from the unique identity previously associated with the rich segment experience, presenting the rich segment experience with other search results on the search result web page if the search query received from the unique identity exceeds a relaxed-trigger threshold, presenting other search results on the search result web page without the rich segment experience if the search query received from the unique identity does not exceed the relaxed-trigger threshold, responsive to receiving the search query from a different unique identity not previously associated with the rich segment experience, presenting the rich segment experience with other search results if the search query received from the different unique identity exceeds a stringent-trigger threshold greater than the relaxed-trigger threshold, and presenting other search results on the search result web page without the rich segment experience if the search query received from the different unique identity does not exceed the stringent-trigger threshold. In this example and/or other examples, logging the browsing history for the unique identity may include generating keyword tags derived from one or more of previous search queries, previously selected search results, previously presented rich segment experiences. In this example and/or other examples, each rich segment experience may be defined in terms of a different set of keyword tags, and the correlation criteria may be satisfied based on a set of keyword tags associated with the rich segment experience matching keyword tags associated with the unique identity. In this example and/or other examples, logging the browsing history for the unique identity may include filtering out previously selected search results having dwell times that are less than a threshold time from being used to generate keyword tags for the unique identity.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

What is claimed is:

1. A method for presenting rich segment experiences on a search engine results page (SERP), the method comprising:
   receiving, at a computing system that is executing a search engine, a query from a computing device that is in network communication with the computing system;
   identifying search results based upon the query;
   generating a first score for a first rich segment experience based upon the query, where the first rich segment experience relates to a first topic;
   generating a second score for a second rich segment experience based upon the query, wherein the first rich segment experience and the second rich segment experience are different from one another, and further wherein the second rich segment experience relates to a second topic that is different from the first topic;
   generating the SERP based upon the query, the first score, and the second score, wherein the SERP includes the search results, the first rich segment experience, and the second rich segment experience; and
   transmitting the SERP to the computing device for presentment to a user of the computing device.

2. The method of claim 1, wherein the first rich segment experience relates to a first subject, and further wherein the second rich segment experience relates to a second subject that is different from the first subject.

3. The method of claim 1, wherein the first rich segment experience relates to a first theme, and further wherein the second rich segment experience relates to a second theme that is different from the first theme.

4. The method of claim 1, wherein the first score is based further upon the search results and the second score is based further upon the search results.

5. The method of claim 1, further comprising:
   determining that the first score is greater than a first predefined threshold value;
   determining that the second score is greater than a second predefined threshold value that is different from the first predefined threshold value;
   selecting the first rich segment experience for inclusion in the SERP based upon the first score being greater than the first predefined threshold value; and
   selecting the second rich segment experience for inclusion in the SERP based upon the second score being greater than the second predefined threshold value.

6. The method of claim 5, wherein the first rich segment experience is assigned to a unique identity of a user who submitted the query, and further wherein the first predefined threshold value is based upon the first rich segment experience being assigned to the unique identity.

7. The method of claim 6, wherein the second rich segment experience is not assigned to the unique identity, and further wherein the second predefined threshold value is higher than the first predefined threshold value due to the first rich segment experience being assigned to the unique identity while the second rich segment experience is not assigned to the unique identity.

8. The method of claim 1, wherein the first rich segment experience is assigned to a unique identity of a user who submitted the query, and further wherein the first score is based upon the first rich segment experience being assigned to the unique identity.

9. The method of claim 1, wherein the second rich segment experience is not assigned to the unique identity, and further wherein the second score is based upon the second rich segment experience not being assigned to the unique identity.

10. A computing system comprising:
    a processor; and
    memory storing instructions that, when executed by the processor, cause the processor to perform acts comprising:
      receiving, from a client computing device that is in network communication with the computing system, a query set forth by a user of the client computing device;
      identifying search results based upon the query;
      identifying a first rich segment experience and a second rich segment experience based upon the query, wherein the first rich segment experience is related to a first topic, and further wherein the second rich segment experience is related to a second topic that is different from the first topic;
      computing a first score for the first rich segment experience based upon the query;
      computing a second score for the second rich segment experience based upon the query;
      selecting both the first rich segment experience and the second rich segment experience for inclusion in a search engine results page (SERP) based upon the first score and the second score, respectively;

generating the SERP, wherein the SERP includes the search results, the first rich segment experience, and the second rich segment experience, where the first rich segment experience and the second rich segment experience are presented in a visually distinct manner relative to the search results in the SERP; and transmitting the SERP to the client computing device for presentment to the user.

11. The computing system of claim 10, the acts further comprising:

performing a first comparison between the first score and a stringent-trigger threshold, wherein the first rich segment experience is selected for inclusion in the SERP based upon the first comparison; and performing a second comparison between the first score and a relaxed-trigger threshold that is different from the stringent-trigger threshold, wherein the second rich segment experience is selected for inclusion in the SERP based upon the second comparison.

12. The computing system of claim 11, wherein the user is associated with a unique identity, the unique identity has the second rich segment experience assigned thereto, and further wherein the relaxed-trigger threshold is used in the second comparison due to the unique identity having the second rich segment experience assigned thereto.

13. The computing system of claim 12, wherein the unique identity does not have the first rich segment experience assigned thereto, and further wherein the stringent-trigger threshold is used in the first comparison due to the unique identity not having the first rich segment experience assigned thereto.

14. The computing system of claim 13, wherein the stringent-trigger threshold is higher than the relaxed-trigger threshold.

15. The computing system of claim 11, wherein the unique identity has the second rich segment experience assigned thereto based upon an amount of overlap between a first set of keyword tags assigned to the unique identity and a second set of keyword tags assigned to the second rich segment experience.

16. The computing system of claim 10, the acts further comprising:

receiving, from a second client computing device that is in network communication with the computing system, the query, wherein the query is set forth by a second user of the second client computing device;

generating a second SERP based upon the query, wherein the second SERP fails to include the second rich segment experience; and transmitting the second SERP to the second client computing device for display to the second user.

17. The computing system of claim 10, wherein at least one of the first rich segment experience or the second rich segment experience includes a video.

18. A non-transitory computer-readable medium comprising instructions that, when executed by a processor, cause the processor to perform acts comprising:

receiving, at a computing system that is executing a search engine, a query from a computing device that is in network communication with the computing system;

identifying search results based upon the query;

generating a first score for a first rich segment experience based upon the query;

generating a second score for a second rich segment experience based upon the query, wherein the first rich segment experience is related to a first topic and the second rich segment experience is related to a second topic that is different from the first topic;

selecting the first rich segment experience for inclusion in a search engine results page (SERP) based upon the first score;

selecting the second rich segment experience for inclusion in the SERP based upon the second score;

generating the SERP, wherein the SERP includes the search results, the selected first rich segment experience, and the selected second rich segment experience; and transmitting the SERP to the computing device for presentment to a user of the computing device.

19. The non-transitory computer-readable medium of claim 18, the acts further comprising:

receiving, at the computing system, the query from a second computing device that is in network communication with the computing system; and generating a second SERP in response to receiving the query, wherein the second SERP comprises the search results but fails to include at least one of the first rich segment experience or the second rich segment experience.

20. The method of claim 1, further comprising:

comparing the first score with a first threshold;

comparing the second score with a second threshold, where the second threshold differs from the first threshold; and including the first rich segment experience in the SERP due to the first score exceeding the first threshold and including the second rich segment experience in the SERP due to the second score exceeding the second threshold.

* * * * *